(12) United States Patent
Tägtström et al.

(10) Patent No.: US 6,715,968 B1
(45) Date of Patent: Apr. 6, 2004

(54) CUTTING INSERT FOR GROOVING OPERATIONS

(75) Inventors: Pär Tägtström, Sandviken (SE); Per Hansson, Gävle (SE); Claes Andersson, Gävle (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/786,757

(22) PCT Filed: Sep. 8, 1999

(86) PCT No.: PCT/SE99/01565

§ 371 (c)(1),
(2), (4) Date: May 14, 2001

(87) PCT Pub. No.: WO00/13824

PCT Pub. Date: Mar. 16, 2000

(30) Foreign Application Priority Data

Sep. 9, 1998 (SE) .................................... 9803083

(51) Int. Cl.⁷ .......................... B23B 27/04; B23P 15/28
(52) U.S. Cl. ...................................... 407/116; 407/117
(58) Field of Search ................... 407/113, 117, 407/114, 116

(56) References Cited

U.S. PATENT DOCUMENTS

| | | | |
|---|---|---|---|
| 3,520,041 A | * 7/1970 | Shepard | 407/115 |
| 4,778,311 A | 10/1988 | Niemi | |
| 4,844,668 A | * 7/1989 | Pettersson | 407/117 |
| 4,890,961 A | 1/1990 | Carl et al. | |
| 4,969,779 A | * 11/1990 | Barten | 407/114 |
| 4,992,008 A | 2/1991 | Pano | |
| 5,135,336 A | 8/1992 | Noguchi et al. | |
| 5,205,680 A | * 4/1993 | Lindstedt | 407/116 |
| D350,549 S | * 9/1994 | Lindstedt et al. | D15/139 |
| 5,423,639 A | 6/1995 | Wiman | |
| 5,676,495 A | * 10/1997 | Katbi et al. | 407/114 |
| 5,924,826 A | * 7/1999 | Bystrom et al. | 407/103 |
| 5,934,843 A | 8/1999 | Brask et al. | |
| 5,975,812 A | * 11/1999 | Friedman | 407/113 |
| 6,086,291 A | 7/2000 | Hansson et al. | |
| 6,261,032 B1 | * 7/2001 | Duwe et al. | 407/107 |

\* cited by examiner

*Primary Examiner*—A. L. Wellington
*Assistant Examiner*—Brian D. Walsh
(74) *Attorney, Agent, or Firm*—Burns, Doane, Swecker & Mathis, LLP

(57) ABSTRACT

A double ended metal-cutting insert includes a pair of circular cutting edges disposed at respective end surfaces of the insert. Each end surface includes an upper portion connected to the cutting edge, and a lower portion connected to the upper portion by a concave transition portion. The lower portion is recessed relative to the upper portion in a direction toward the opposite cutting edge. The lower portion is a flat face oriented perpendicular to the bottom surface.

7 Claims, 2 Drawing Sheets

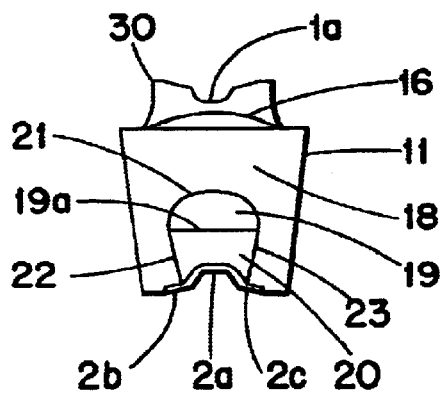
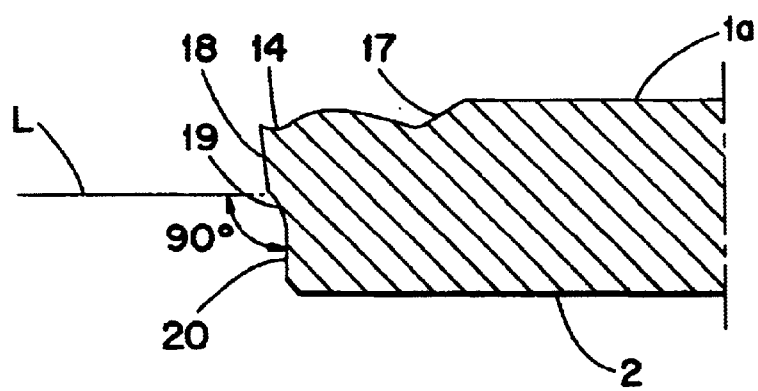
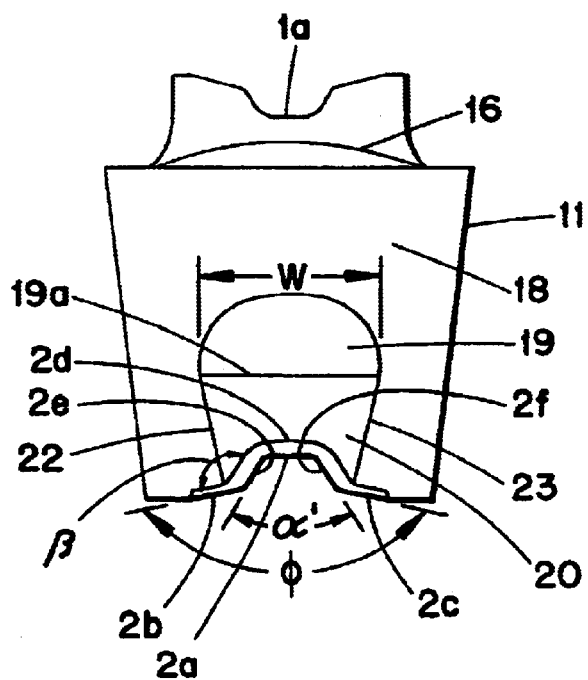

CUTTING INSERT FOR GROOVING OPERATIONS

BACKGROUND

The present invention relates to a cutting insert for the turning of grooves and parting operations. In particular the cutting insert, according to the invention, is suitable for the turning of grooves, although it also can be used for different axial grooving and parting operations, as well as for axial and radial longitudinal turning.

In such machining operations, chip breaking and chip forming are frequently of decisive importance for undisturbed output. Modern, high productive machines are very dependent on good chip transport. Long, uncontrollable chips can easily cause machine interruptions and rejection of parts. Chip control must therefore be given high priority and it governs, to a high degree, the tool design.

Cutting inserts intended for grooving operations and parting are usually clamped in a holder, which is blade shaped in order to fit into the slot produced in a workpiece. Such cutting inserts are for example known from U.S. Pat. No. 4,778,311, U.S. Pat. No. 4,992,008, U.S. Pat. No. 5,135,336 and U.S. Pat. No. 5,423,639. At the same time there is nowadays a requirement to, if possible, obtain an improved surface finish of the surfaces in the slots produced. A first purpose of the invention is to produce a cutting insert, which is well suited to give improved surface finish of the surfaces in the slot produced in a work piece.

It is another purpose of the present invention to provide a cutting insert, which is well suited for repeated radial grooving as well as longitudinal turning.

It is a third purpose of the present invention to produce a cutting insert which gives advantages from a pressing technology point of view during insert manufacture because portions with large radii give a more even compacting result, especially in the production of more difficult-to-press material such as cermets.

It is a fourth purpose of the present invention to produce a double-ended cutting insert the clearance surface of which, below the main cutting edge, will serve as an axial stop surface, whereby the design thereof is optimized such that the insert is suitably protected during continuous chip forming machining.

SUMMARY OF THE INVENTION

These other purposes have been achieved by a cutting insert for grooving by a double-ended metal cutting insert which comprises a body that includes an upper surface, a bottom surface, two mutually parallel side surfaces each extending between the upper and bottom surfaces, first and second end surfaces disposed at respective axial ends of the body, and a groove formed in the bottom surface. The groove includes a central concave portion and two support surfaces extending downwardly from respective sides of the concave portion. The support surfaces diverge in a downward direction. An intersection between the upper surface and the first and second end surfaces form first and second cutting edges, respectively. Each of the first and second end surfaces includes an upper portion connected to a respective one of the first and second cutting edges, and a lower portion connected to the upper portion by a concave transition portion, wherein the lower portion is recessed axially inwardly relative to the upper portion. The lower portion is oriented perpendicular to the bottom surface.

BRIEF DESCRIPTION OF THE INVENTION

For illustrative but non-limiting purposes preferred embodiments of the invention will now be described in more detail with reference to the enclosed drawings. These are presented shortly hereby:

FIG. 4 shows the same cutting insert as in FIG. 1 as seen straight from the forward end;

FIG. 5 shows a sectional view V—V centrally through the insert in FIG. 3; and

FIG. 6 is an enlarged view of FIG. 4.

DETAILED DESCRIPTION OF A PREFERRED EMBODIMENT OF THE INVENTION

Figure 1:
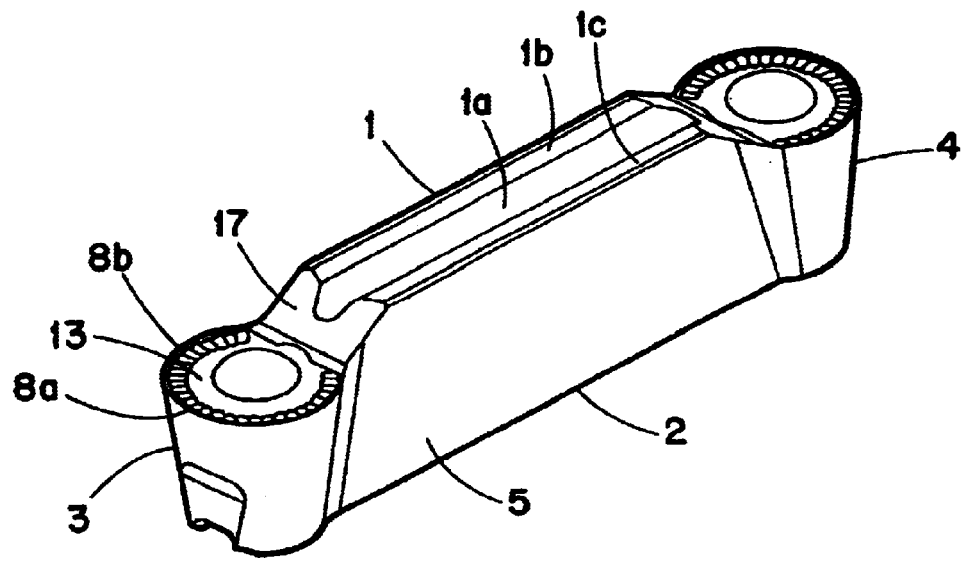
FIG. 1 shows a cutting insert according to the invention in a perspective view as seen obliquely from above.

FIGS. 1–5 show a cutting insert for grooving according to the invention including a body of parallelepipedic shape with an upper surface 1, a bottom surface 2, a forward end surface 3, and a rear end surface 4, having the same form as the forward end surface and mutually opposed plane parallel side faces 5, 6. The upper surface 1 and the bottom surface 2 of the insert are shaped with a longitudinally concave V-shaped keyway or groove 1a and 2a. The groove 1a extends into oblique surfaces 1b, 1c. Bottom support surfaces 2b, 2c of the groove 1a extend at an obtuse angle $\beta$ from each side of the central concave keyway 2a, and together define an obtuse angle $\phi$. A base surface 2d of the groove faces downwardly and connects to a pair of intermediate support surfaces 2e, 2f that are situated between the base surface 2d and the bottom surfaces 2b, 2c. The intermediate support surfaces 2e, 2f together define an acute angle $\alpha'$, are intended to rest against the correspondingly inclined support surfaces in a blade holder in the way that is described in Swedish patent application 9703434-2 corresponding to Hansson et al. U.S. Pat. No. 6,086,291, the content of which is hereby incorporated by reference, the central part of the insert constituting a shank portion with a cutting head formed at each end thereof. Each cutting head has an end surface composed of a front clearance surface 3 or 4 that by intersection with the upper surface 1 at a positive angle $\alpha$ forms a cutting edge 8a. The cutting edge 8a is circular and includes side edges 8b with the same uniform radius. The cutting edge 8a, 8b has a diameter D which exceeds the perpendicular distance d between the side faces 5, 6. As a result hereof side edges 8b and their side clearance faces 11, 12 protrude laterally outwardly from the shank portion and via an obliquely inclined break line 13a intersects the side surface 5. Alternatively the main cutting edge could have a straight contour oriented perpendicularly to the longitudinal direction of the cutting insert whereas the side edges would extend at a certain clearance angle from the longitudinal direction of said insert.

Figure 2:
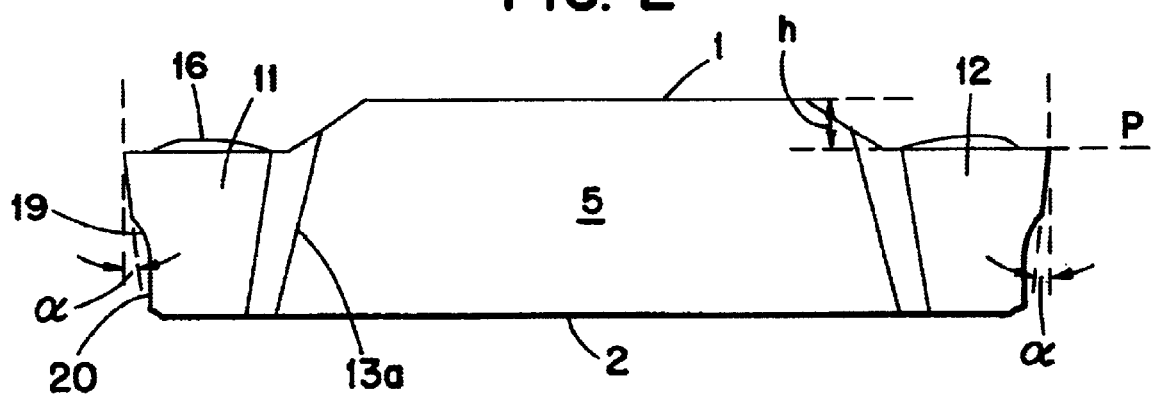
FIG. 2 shows the same cutting insert as in FIG. 1 as seen straight from the side.
Figure 3:
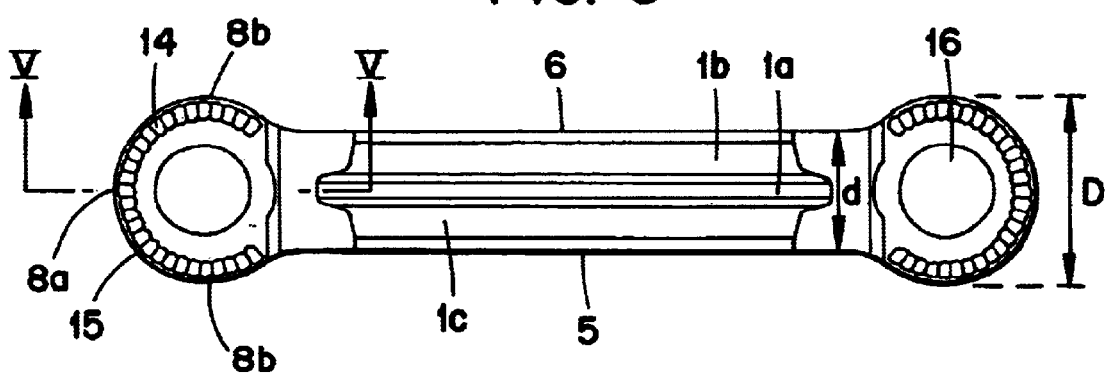
FIG. 3 shows the same cutting insert as in FIG. 1 as seen straight from above.

The cutting head at each end of the insert is provided with an upper chip surface 13, which is provided with a chip forming device in the form of a number of recesses 14, each of which has concave cross-section. Between these recesses and the cutting edge there is provided a planar reinforcing chamfer 15, which reinforces the cutting edge. Said chamfer 15 is planar in shape and defines a neutral plane P. These recesses 14 intersect each other along edges which extend perpendicularly towards the cutting edge. The central surface of the upper side of the cutting head has the form of a convexly curved surface 16, the highest position of which is located at the same level or somewhat below the bottom of the trail 1a, as best appears in FIG. 5. The recesses 14 are provided to give the insert a positive chip angle of 5° to 30° so as to enable plastic deformation of the chip such that it becomes easier to break. Such as best seen in FIG. 2 the transition between convex surface 16 and the area confined by the surfaces 1a, 1b, 1c is formed by an upwardly inclined planar surface 17, which should be inclined 30°–55° relatively to the neutral plane P. Each of the longitudinal surfaces 1b, 1c extends upwardly into a crest 30, which defines the highest level of the cutting insert portion with height h above the neutral plane P.

According to the embodiment of the invention shown in FIGS. 1–5 there is shown an insert wherein the end surface 3 or 4 of each cutting head is provided with a first upper clearance surface 18 having an unbroken convex surface contour, which extends to the cutting edge 8a. A smoothly concavely curved surface 19 forms a transition surface to a lower surface 20 of the end surface 3 or 4, which surface 20 is displaced axially inwards towards the insert body relative to the surface 18. Both of the surfaces 19 and 20 have a greatest width W, which must be smaller than of the cutting head diameter D. The lower surface 20 is intended to serve as an axial stop surface with the cutting insert clamped into a holder. The surface 20 should preferably form a right angle with the plane which contains the cutting insert bottom surface 2, whereby the lower surface 20 is perpendicular to a longitudinal axis L of the insert. Through this embodiment the axial stop surface 20 becomes well protected under continuous machining thanks to the shoulder which is formed by the concave surface 19. In a possible alternative embodiment the main cutting edge, in its entirety, could extend perpendicularly to the longitudinal direction of the cutting insert and in such a case the lower surface 20 could have same width as the cutting head.

According to a preferred embodiment the intermediate surface 19 could be limited in its extent by a concavely curved section line 21. Further, the transition between 19 and 20 is in the form of a straight, horizontal line 19a. The lower surface 20 is laterally confined relative to the clearance surface 11 by two straight downward converging sectional lines 22, 23. Further, the greatest width between the obliquely downward converging sectional lines 22, 23 should be equal or smaller than the width between the central mutually plane parallel side faces 5, 6. What is distinguishing is that the V-shaped recess formed on the underside of the insert formed by the partial surfaces 2a, 2b, 2c extend along the entire length of the insert. As a consequence thereof the intersection line between surface 20 and the V-shaped recess defines a U-shaped contour. According to a particularly preferred embodiment the size of the radius of the concave surface 19 should be such that one obtains an angular difference between the surfaces 18 and 19, which lies in the range of 10°–60°, preferably 30°–45°.

What is claimed is:

1. A double-ended metal cutting insert comprising a body including an upper surface, a bottom surface, two mutually parallel side surfaces each extending between the upper and bottom surfaces, first and second end surfaces disposed at respective axial ends of the body, and a groove formed in the bottom surface, the groove including a base portion, two bottom support surfaces, disposed on opposite sides of the groove, and two intermediate support surfaces disposed on opposite sides of the groove and each situated between the base portion and a respective one of the bottom support surfaces, the support surfaces diverging in a downward direction and together defining an obtuse angle, the intermediate support surfaces diverging in downward direction and together defining an acute angle, an intersection between the upper surface and the first and second end surfaces forming first and second cutting edges, respectively, each of the first and second end surfaces including an upper portion connected to a respective one of the first and second cutting edges, and a lower portion connected to the upper portion by a smoothly concavely curved transition portion wherein the lower portion is recessed axially inwards relative to the upper portion, the lower portion oriented perpendicular to a longitudinal axis of the body.

2. Cutting insert according to claim 1 wherein each of the end surfaces is of convexly curved shape as viewed in a direction perpendicular to the upper surface, wherein an intersection between the transition surface and the upper portion forms a concavely curved line, and said lower portion is laterally confined by two downwards converging lines.

3. Cutting insert according to claim 2 wherein a greatest distance between said two downwards converging lines is no greater than a maximum distance between the side surfaces, each of the end surfaces extending laterally outwardly past both of the side surfaces as the insert is viewed in a direction perpendicular to the upper surface.

4. Cutting insert according to claim 1 wherein the groove extends throughout an entire axial length of the insert and intersects the end surfaces.

5. Cutting insert according to claim 1 wherein the upper portion is inclined downwardly and axially inwardly from the cutting edge to define a clearance face.

6. Cutting insert according to claim 1 wherein the cutting edge is defined by a diameter greater than a maximum distance between the side surfaces.

7. Cutting insert according to claim 6 including a groove formed in the upper surface and extending in an axial direction.

* * * * *